US007251195B1

(12) United States Patent
Reiff et al.

(10) Patent No.: US 7,251,195 B1
(45) Date of Patent: Jul. 31, 2007

(54) APPARATUS FOR GENERATING AN ACOUSTIC SIGNAL

(75) Inventors: Christian G. Reiff, Arlington, VA (US); Harold Boesch, Jr., Beltsville, MD (US); Bruce T. Benwell, Sumerduck, VA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 820 days.

(21) Appl. No.: 10/693,483

(22) Filed: Oct. 23, 2003

(51) Int. Cl.
*H04B 1/02* (2006.01)
*G01V 1/157* (2006.01)

(52) U.S. Cl. ........................................ 367/139; 367/147

(58) Field of Classification Search ................ 367/147, 367/139
See application file for complete search history.

(56) References Cited

U.S. PATENT DOCUMENTS

| | | | | |
|---|---|---|---|---|
| 3,715,710 A | | 2/1973 | Bernstein et al. | 340/5 R |
| 3,879,698 A | | 4/1975 | Pepper | 340/5 R |
| 4,651,311 A | | 3/1987 | Owen et al. | 367/147 |
| 4,706,228 A | | 11/1987 | Owen et al. | 367/147 |
| 4,734,894 A | | 3/1988 | Cannelli et al. | 367/147 |
| 4,764,906 A | | 8/1988 | Clements et al. | 367/142 |
| 4,796,608 A | | 1/1989 | Koehler | 128/24 A |
| 5,228,011 A | | 7/1993 | Owen | 367/147 |
| 5,233,972 A | | 8/1993 | Rattner | 128/24 EL |
| 5,251,614 A | | 10/1993 | Cathignol et al. | 128/24 EL |
| 5,305,287 A | | 4/1994 | Ballard, Jr. et al. | 367/147 |
| 5,317,229 A | | 5/1994 | Koehler et al. | 310/334 |
| 5,398,217 A | | 3/1995 | Cannelli et al. | 367/147 |
| 5,903,518 A | | 5/1999 | Benwell et al. | 367/139 |
| 6,018,502 A | * | 1/2000 | Fry, Jr. | 367/147 |
| 6,113,560 A | | 9/2000 | Simnacher | 601/4 |
| 6,383,152 B1 | | 5/2002 | Hartmann et al. | 601/4 |
| 6,687,189 B1 | * | 2/2004 | Schaefer et al. | 367/147 |
| 2001/0011590 A1 | | 8/2001 | Thomas et al. | 166/248 |

* cited by examiner

*Primary Examiner*—Dan Pihulic
(74) *Attorney, Agent, or Firm*—William V. Adams

(57) ABSTRACT

An apparatus for generating an acoustic signal which has a dielectric substrate having opposed first and second sides. A pair of electrodes are mounted on the first surface of the substrate so that the electrodes are spaced apart from each other. A high voltage power source is electrically connected to the electrodes to produce a high voltage electric potential between the electrodes and this high voltage electric potential is less than a level sufficient to create a surface arc discharge along the first surface of the dielectric substrate. An electrical conductor strip is mounted to the second side of the substrate. A trigger signal circuit then applies a trigger voltage signal to either the electrical connector strip or one of the electrodes which varies the electric field between the electrodes in an amount sufficient to ionize air adjacent one of the electrodes and create a surface arc discharge along the first surface of the dielectric between the electrodes which generates the acoustic impulse as a byproduct of the discharge.

17 Claims, 1 Drawing Sheet

APPARATUS FOR GENERATING AN ACOUSTIC SIGNAL

GOVERNMENT INTEREST

The invention described herein may be manufactured, used, and licensed by or for the United States Government.

BACKGROUND OF THE INVENTION

I. Field of the Invention

The present invention relates to a device for generating an acoustic signal as a product of surface arc discharge between two electrodes.

II. Description of Related Art

There are many previously known devices which rely upon an electric arc discharge between two electrodes to generate an acoustic pulse of high volume. Such devices have many uses, but are particularly useful for crowd control and as a non-lethal weapon.

One such device is disclosed in U.S. Pat. No. 5,903,518 to Benwell et al. In the Benwell et al. patent, a pair of spaced electrodes are contained within a housing and separated by an air gap. A high voltage power supply is electrically connected to the electrodes so that a high voltage electric potential is created between the electrodes.

In order to initiate the electric arc between the electrodes across the air gap, a high voltage signal is applied to a trigger electrode positioned in between the electrodes. The potential between the trigger electrode and the main electrodes is then sufficient to ionize the air between the electrodes thus forming an electrically conductive path and creating an arc discharge between the electrodes. A high volume acoustic pulse, in addition to heat and light, results from the arc discharge.

The previously known devices for generating an acoustic pulse using an arc discharge across an air gap, however, are disadvantageous for several reasons. One disadvantage of these previously known devices is that the distance between the electrodes, and thus the ultimate length of the electric arc between the electrodes, is limited which limits the length of the electric arc discharge. This limited length for the electric arc discharge limits the acoustical output from the device.

While it is possible to increase the length of the arc discharge through air by increasing the high voltage power supply applied to the electrodes, the use of such extremely high voltage power sources is not only expensive, but also potentially hazardous.

SUMMARY OF THE PRESENT INVENTION

The present invention provides a device for generating an acoustic pulse utilizing an electric arc discharge which overcomes all of the above-mentioned disadvantages of the previously known devices.

In brief, the present invention comprises a dielectric substrate having opposed first and second surfaces. Any conventional dielectric material, such as alumina, can be used as a substrate. The dielectric material should be of uniform thickness and homogenous parallel to the surface. The dielectric material can be a layered composite perpendicular to the surface to combine beneficial properties.

A pair of electrodes are mounted on the first surface of the substrate so that the electrodes are spaced apart from each other. A high voltage power source is then electrically connected to the electrodes to produce a high voltage electric potential between the electrodes. This high voltage electric potential, however, is below a level sufficient to create a surface arc discharge along the first surface of the dielectric substrate.

An electrical conductor strip is then mounted to the second side of the substrate. The conductor strip is maintained at ground potential through a large resistance when not triggering the surface arc discharge. The voltage applied to the electrodes causes an opposing mirror charge distribution to be developed in the conductor strip creating a large electric field through the dielectric substrate between the conductor strip and the electrodes.

In order to initiate the surface arc discharge along the first surface of the dielectric, the electric field between the electrodes and the conductor strip is abruptly altered thus intensifying the electric field between one or both electrodes and the conductor strip.

The intensified electric field between the conductor strip and electrode breaks down the air at the first surface of the dielectric thus causing a plasma which extends from one electrode to the other electrode until a conductive plasma path completes the electric circuit between the electrodes. When this happens, a surface arc occurs between the electrodes thus creating a large thermal impulse and hence an acoustic pulse of high volume.

Any appropriate means may be utilized to abruptly alter and intensify the electric field between the electrodes and the conductor strip. However, in a preferred embodiment, a voltage pulse is applied to the electrical conductor strip which intensifies the potential difference, and thus the electric field, between the conductor strip and at least one of the electrodes. The magnitude of this electric field is sufficient to ionize the air at the surface of the dielectric at least one of the electrodes. The ionized air forms a plasma which extends from one electrode toward the other. When the plasma extends completely between the electrodes, the conductive path formed by the plasma electrically connects the electrodes and forms the surface arc discharge between the electrodes. The thermal pulse from the surface arc discharge creates an acoustic pulse of high volume.

In order to prevent the accumulation of trapped charge on the surface of the dielectric following repeated surface arc discharges, preferably at least one and more preferably an array of corona discharge points are positioned above the first surface of the dielectric in between the electrodes. These corona discharge points enable repeated electric arc discharges between the electrodes by dissipating any accumulated charge on the surface of the dielectric.

In practice, the present device, by utilizing a surface arc discharge between the two electrodes rather than the previously known air gap, is able to achieve longer electric arc discharges at the same electric potential between the electrodes than obtainable through previously known air gap arc discharges. Such increased length of the discharge results in a higher volume acoustic pulse.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DESCRIPTION OF THE PREFERRED EMBODIMENTS OF THE PRESENT INVENTION

Figure 1:
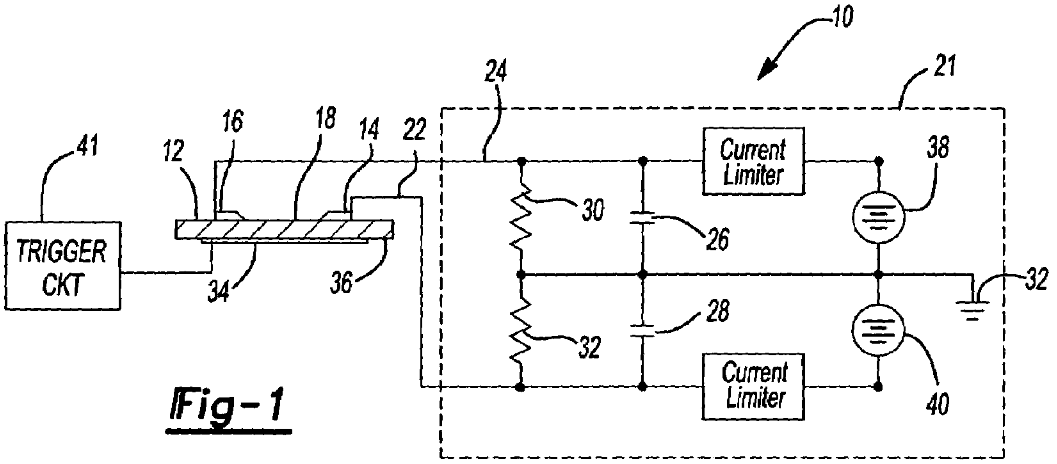
FIG. 1 is a partial diagrammatic schematic view illustrating a preferred embodiment of the present invention.
Figure 2:
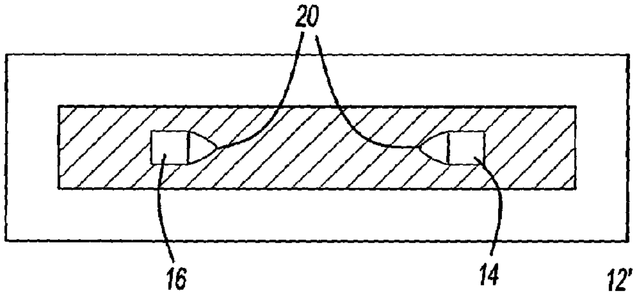
FIG. 2 is a top plan view taken substantially along line 2—2 in FIG. 1.

With reference first to FIGS. 1 and 2, a preferred embodiment of the apparatus 10 for generating an acoustical pulse is shown and comprises a dielectric substrate 12 illustrated in FIGS. 1 and 2 as being generally flat and planar. Any conventional dielectric material may be utilized for the dielectric substrate 12. In the preferred embodiment, however, the substrate 12 comprises alumina not only for its dielectric characteristics, but also for its ability to sustain both shock and heat that occur during an electric arc discharge.

Still referring to FIGS. 1 and 2, a pair of electrodes 14 and 16 are mounted to a first surface 18 of the dielectric substrate 12 so that the electrodes 14 and 16 are spaced apart from each other. As best shown in FIG. 2, the electrodes 14 and 16 each include a rounded nose 20 and these rounded noses 20 face each other. The rounded noses 20 enhance the initiation of the electric surface arc between the electrodes 14 and 16 between the noses 20.

Additionally, the remaining edges on the electrodes 14 and 16 are all preferably rounded. Such rounded edges on the electrodes 14 and 16 prevent or at least minimize the likelihood of an unwanted electric arc discharge from the electrodes 14 and 16 to any structure surrounding the electrodes 14 and 16.

With reference now particularly to FIG. 1, a high voltage power source 21 is electrically connected by leads 22 and 24 to the electrodes 14 and 16, respectively. In doing so, a high voltage electric potential is created between the electrodes 14 and 16.

The magnitude of the voltage source 21, and thus of the electric potential between the electrodes 14 and 16, will vary depending upon numerous factors, including the spacing between the electrodes 14 and 16. However, as an example, with the electrodes 14 and 16 spaced a few inches apart on the dielectric substrate 12, the power source 21 will maintain a voltage potential in the range of −10 KV on one electrode 14 or 16, and +10 KV on the other electrode 14 or 16.

The high voltage power source 21 may be of any conventional construction. However, as illustrated in FIG. 1, the power source 21 includes a high voltage positive DC power source 40 as well as a high voltage negative DC power source 38. The power sources 38 and 40 respectively charge two capacitors 26 and 28, each having a high impedance bleed resistor 30 and 32, respectively.

The positive pole of the capacitor 26 is electrically connected by the line 24 to the electrode 16 thus maintaining the electrode 16 at a positive high voltage. Similarly, the negative pole of the capacitor 28 is electrically connected to the electrode 14 thus maintaining electrode 14 at a high voltage negative potential. The other poles of the capacitors 26 and 28 are maintained at ground 32. Consequently, the power source 21 maintains a high voltage electric potential between the electrodes 14 and 16 but which is below a level sufficient to create a surface arc discharge along the surface 18 of the dielectric 12.

Still referring to FIG. 1, an electrical conductor strip 34, such as a metal plate, is positioned on a surface 36 of the dielectric 12 opposite from its surface 18. A voltage trigger circuit 41 is then electrically connected to the conductor strip 34. The trigger circuit 41 provides a voltage potential to the conductor strip 34, preferably in the form of a voltage pulse of a magnitude of the same order as the voltage of the power source 21. This trigger voltage pulse on the conductor plate 34 is sufficient to vary and intensify the vertical electric field through the dielectric substrate 12 at one or both of the electrodes 14 and 16 to a degree that the electric field at the surface 18 of the dielectric 12 exceeds the dielectric strength of air along the surface 18 of the dielectric substrate 12. When this occurs, a plasma is formed at the electrode 14 and/or 16 and this plasma, since it is conductive, extends the terminal voltage potential from the terminal through the plasma. In doing so, the plasma propagates along the surface 18 of the dielectric substrate between the electrodes 14 and 16 thus electrically connecting the electrodes 14 and 16 and creating the surface arc discharge along the dielectric surface 18.

The trigger circuit 41 may be of any conventional construction so that no further description thereof is necessary. However, in the simplest embodiment, the trigger circuit 41 is a transformer which generates a pulsed 60 Hertz sinusoidal high voltage output signal to the conductor strip 34 which produces a surface arc discharge between the terminals 14 and 16 for each cycle of the sinusoidal wave. Other waveforms, however, may alternatively be used without deviation from the spirit or scope of the invention.

Furthermore, although the use of a trigger circuit 41 which provides a voltage signal to the conductor strip 34 comprises the preferred method to intensify the electric field at one or both electrodes 14 and 16 and thus initiate the surface arc discharge between the electrodes 14 and 16, it will be understood that other means may be utilized to trigger the surface arc discharge between the electrodes 14 and 16. For example, the conductor strip 34 may be maintained at a predetermined potential, such as ground, and the trigger circuit 41 may be electrically connected to either of the electrodes 14 and 16. In this case, the trigger circuit, by varying the electric potential at one or both electrodes 14 and 16 relative to the conductor strip 34, is sufficient to ionize the air adjacent one or both terminals 14 and 16 and thus initiate the plasma with the resulting surface arc discharge.

Unlike the previously known acoustic generators which utilize an electric air discharge, the surface arc discharge of the present invention is able to obtain the same length arc discharge with lower voltages for a comparable air discharge electric arc device. Furthermore, for equivalent voltages, the surface arc discharge device of the present invention is able to produce much longer surface arc discharges than air arc devices. The longer discharge, in turn, produces a higher volume acoustic pulse. In practice, acoustic pulses in the range of 145 db at ten feet with a repetition rate of ten cycles per second and duration of 200 μs are obtainable with the present invention.

Figure 3:
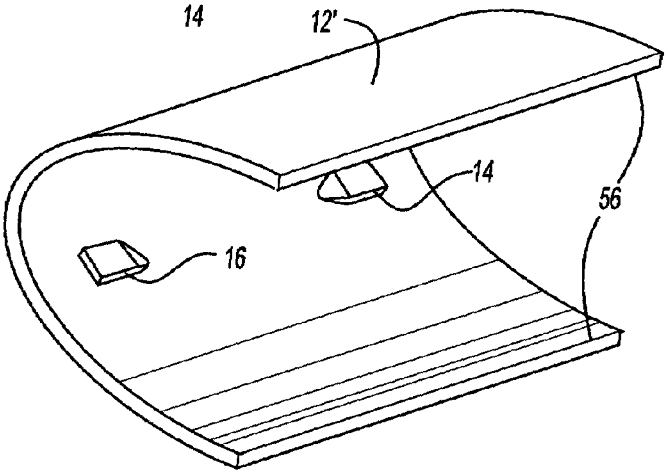
FIG. 3 is a side view illustrating a further preferred embodiment of the present invention.

With reference now to FIG. 3, the dielectric 12 has thus been described as generally planar in shape. In practice, however, the dielectric 12 may be of any desired shape, such as the dielectric 12' in FIG. 3. Furthermore, with the dielectric 12' in the shape of a parabola as shown in FIG. 3, the dielectric 12 with an opening bounded by edges 56 that are parallel to and spaced from a line extending from the electrode 14 and to the electrode 16 can be used to improve the directionality of the acoustic pulse generated by the apparatus 10 of the present invention.

Figure 4:
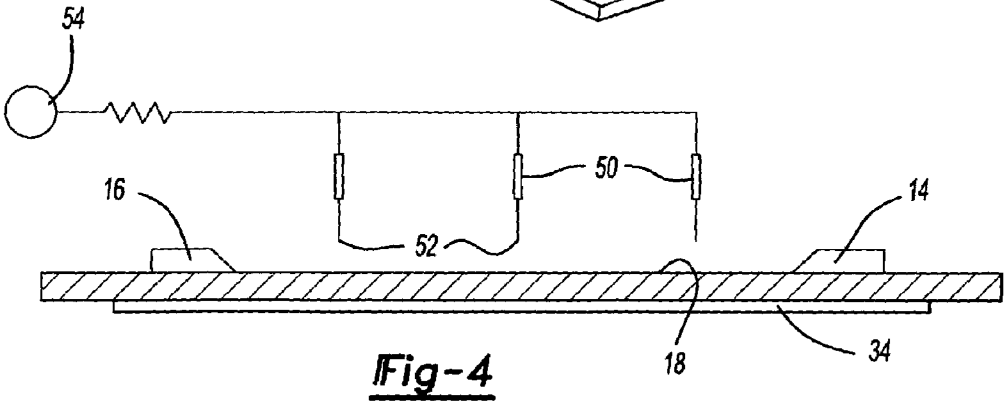
FIG. 4 is a side view illustrating yet a further preferred embodiment of the present invention.

With reference now to FIG. 4, it has been found that after each surface arc discharge, the dielectric surface retains areas of trapped charge which inhibit the initiation of subsequent surface arc discharges after repeated discharges. This difficulty, however, may be overcome by providing at least one, and preferably an array of corona points 52 above the surface 18 of the dielectric substrate 12 between the electrodes 14 and 16. These corona points 52 preferably are positioned closely adjacent the surface 18, e.g. approximately one-quarter inch, and are electrically connected through a high impedance resistor 50 to a low voltage power source 54. The corona points 52 effectively dissipate any trapped charge on the surface 18 of the dielectric 12. By eliminating any patches of trapped charge on the dielectric surface 18, the corona points enable consistent arc initiation at relatively low trigger voltages as well as reliable operation with a longer arc at higher voltage differentials. Furthermore, with the corona points 52, the arc can be initiated repeatedly with a positive pulse from the trigger circuit to the conductor strip 34.

From the foregoing, it can be seen that the present invention provides a highly effective means for generating a high volume acoustic pulse for crowd control, non-lethal weaponry and other applications. Having described our invention, however, many modifications thereto will become apparent to those skilled in the art to which it pertains without deviation from the spirit of the invention as defined by the scope of the appended claims.

We claim:

1. An apparatus for generating an acoustic signal comprising:

a dielectric substrate having opposed first and second opposed surfaces, a pair of electrodes mounted on said first surface of said substrate so that said electrodes are spaced apart from each other, a high voltage power source electrically connected to said electrodes to produce a high voltage electric potential between said electrodes, said high voltage electric potential being below a level sufficient to create a surface arc discharge along said first surface of said dielectric substrate, an electrical conductor strip mounted to said second side of said substrate, and means for initiating a surface arc discharge along said first surface of said dielectric between said electrodes.

2. The invention as defined in claim 1 wherein said initiating means comprises a trigger circuit having a voltage output signal electrically connected to said conductor strip.

3. The invention as defined in claim 2 wherein said trigger voltage signal comprises a sinusoidal waveform.

4. The invention as defined in claim 1 wherein said substrate is planar.

5. The invention as defined in claim 1 wherein said substrate is formed to have an opening aligned with and spaced from said electrodes.

6. The invention as defined in claim 1 wherein said substrate is shaped to direct sound in a predetermined direction.

7. The invention as defined in claim 6 wherein said substrate is in the shape of a parabola.

8. The invention as defined in claim 1 wherein said substrate comprises alumina.

9. The invention as defined in claim 1 wherein each electrode has a rounded nose, said rounded noses of said electrodes facing each other.

10. The invention as defined in claim 1 and comprising at least one corona discharge point positioned above said first surface of said dielectric between said electrodes.

11. The invention as defined in claim 10 and comprising a plurality of corona discharge points positioned above said first surface of said dielectric between said electrodes.

12. The invention as defined in claim 1 wherein said initiating means comprises means for varying the electric field along said first surface of said dielectric.

13. An apparatus for generating an acoustic signal comprising:

a dielectric substrate having opposed first and second opposed surfaces, a pair of electrodes mounted on said first surface of said substrate so that said electrodes are spaced apart from each other, said first surface of said electrode being positioned in an ambient gas, a high voltage power source electrically connected to said electrodes to produce a high voltage electric potential between said electrodes, said high voltage electric potential being below a level sufficient to create a surface arc discharge along said first surface of said dielectric substrate, an electrical conductor strip mounted to said second side of said substrate, and means for varying the electric field adjacent at least one of said electrodes by an amount sufficient to ionize the gas at said at least one electrode to thereby initiate a surface arc discharge along said first surface of said dielectric between said electrodes.

14. The invention as defined in claim 13 wherein said electric field varying means comprises a trigger circuit having a voltage output signal electrically connected to said conductor strip.

15. An apparatus for generating an acoustic signal comprising:

a dielectric substrate having opposed first and second opposed surfaces, a pair of electrodes mounted on said first surface of said substrate so that said electrodes are spaced apart from each other, said first surface of said dielectric being disposed in a gas, a high voltage power source electrically connected to said electrodes to produce a high voltage electric potential between said electrodes, said high voltage electric potential being below a level sufficient to create a surface arc discharge along said first surface of said dielectric substrate, an electrical conductor strip mounted to said second side of said substrate, and a trigger circuit having a voltage output signal electrically connected to said conductor strip, said trigger voltage output signal having a voltage magnitude sufficient to ionize the gas adjacent at least one of said electrodes thereby initiating a surface arc discharge between said electrodes.

16. The invention as defined in claim 15 and comprising at least one corona discharge point positioned above said first surface of said dielectric between said electrodes.

17. The invention as defined in claim 16 and comprising a plurality of corona discharge points positioned above said first surface of said dielectric between said electrodes.

* * * * *